US011021775B2

(12) United States Patent
Yao et al.

(10) Patent No.: US 11,021,775 B2
(45) Date of Patent: Jun. 1, 2021

(54) COBALT-BASED ALLOYS FOR WOOD CUTTING APPLICATIONS

(71) Applicant: Kennametal Inc., Latrobe, PA (US)

(72) Inventors: Matthew Yao, Latrobe, PA (US); Abdelhakim Belhadjhamida, Ontario (CA); Brad McLane, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 429 days.

(21) Appl. No.: 15/793,706

(22) Filed: Oct. 25, 2017

(65) Prior Publication Data

US 2019/0119789 A1 Apr. 25, 2019

(51) Int. Cl.
*C22C 19/07* (2006.01)
*C22C 29/08* (2006.01)
*C22C 32/00* (2006.01)
*B23D 65/00* (2006.01)

(52) U.S. Cl.
CPC .............. *C22C 19/07* (2013.01); *B23D 65/00* (2013.01); *C22C 29/08* (2013.01); *C22C 32/0047* (2013.01)

(58) Field of Classification Search
CPC ..... C22C 19/07; C22C 29/08; C22C 32/0047; B23D 65/00; A61B 2018/146; B23K 31/025; B23K 35/327
USPC .......................................................... 148/425
See application file for complete search history.

(56) References Cited

U.S. PATENT DOCUMENTS

| 2,030,343 | A | | 2/1936 | Wissler | |
| 2,309,372 | A | | 1/1943 | Wissler | |
| 2,801,165 | A | | 7/1957 | Baldwin | |
| 3,265,494 | A | | 8/1966 | Baldwin | |
| 3,563,731 | A | | 2/1971 | Cape | |
| 4,209,122 | A | * | 6/1980 | Hunt | B21C 37/047 228/173.5 |
| 6,298,762 | B1 | * | 10/2001 | LaRue | B23D 61/023 76/112 |
| 6,479,014 | B1 | | 11/2002 | Wu | |
| 6,733,603 | B1 | | 5/2004 | Wu | |
| 2007/0167736 | A1 | * | 7/2007 | Dietz | A61B 10/0275 600/411 |

OTHER PUBLICATIONS

NPL-1: Liu et al, Sliding wear and solid-particle erosion resistance of a novel high-tungsten Stellite alloy, Wear 322-323 (2015) pp. 41-50. (Year: 2015).*
J. Rodic, Cobalt Base Alloys in Woodcutting Industry, 1991, p. 127-137.
Braxton Bliss et al., Circular Saw Blades and Stellite 12, 2013.
Mar. 2, 2021 Office Action (non-U.S.) DE App. No. 102018123329A1 P17-06263-DE-NP.

* cited by examiner

*Primary Examiner* — Jie Yang
(74) *Attorney, Agent, or Firm* — Larry R. Meenan

(57) ABSTRACT

In one aspect, cobalt-based alloys are described herein comprising composition and microstructure permitting a balance of hardness, toughness and wear resistance desirable for wood cutting applications. A cobalt-based alloy comprises a chromium rich carbide phase in an amount of 15-30 volume percent, a tungsten-rich phase in an amount of 9-15 volume percent and a balance of cobalt-rich solid solution matrix comprising nickel, chromium, vanadium and tungsten.

26 Claims, 7 Drawing Sheets

COBALT-BASED ALLOYS FOR WOOD CUTTING APPLICATIONS

FIELD

The present invention relates to cobalt-based alloys and, in particular, to cobalt-based alloys and associated tooling for wood cutting applications.

BACKGROUND

Wood cutting is a complex process in which many phenomena intersect. Various factors contribute to produce a good cut. These factors generally include sawblade speed, tension, thickness, width, sharpness or tooth angles (clearance, face, hook), gullet shape and depth, tooth pitch or spacing, wood feed speed and wood species. Wood, in contrast to metals and various alloy systems, is not a homogenous and distinct material, but a multifaceted and nonhomogeneous biological material. Tool wear can be caused by gross fracture or chipping (catastrophic), abrasion, erosion, micro-fracture, temperature effects, electrochemical corrosion, moisture and/or oxidation. Moreover, a sharp cutting edge has a positive impact on widely understood machining quality, and therefore it is crucial from an industrial perspective to increase the life-span of the tooling. However, in many instances, cutting tools and associated materials for metal working are largely unsuitable for wood cutting applications. Therefore, development of new material systems is required to address the unique conditions and factors encountered in wood cutting applications.

SUMMARY

In one aspect, cobalt-based alloys are described herein having composition and microstructure permitting a balance of hardness, corrosion resistance, toughness and wear resistance desirable for wood cutting applications. Briefly, a cobalt-based alloy comprises a chromium-rich carbide phase in an amount of 15-30 volume percent, a tungsten-rich phase in an amount of 9-15 volume percent and a balance of cobalt-rich solid solution matrix comprising nickel, chromium, vanadium and tungsten.

In another aspect, tooling articles are described. In some embodiments, a tooling article comprises one or more cutting elements formed of a cobalt-based alloy comprising a chromium-rich carbide phase in an amount of 15-30 volume percent, a tungsten-rich phase in an amount of 9-15 volume percent and a balance of cobalt-rich solid solution matrix comprising nickel, chromium, vanadium and tungsten. The cutting elements can be tips of a sawblade for wood cutting applications.

In another aspect, wires or rods for cutting tool manufacture are described. For example, a wire or rod for cutting tool manufacture comprises cobalt-based alloy comprising a chromium-rich carbide phase in an amount of 15-30 volume percent, a tungsten-rich phase in an amount of 9-15 volume percent and a balance of cobalt-rich solid solution matrix comprising nickel, chromium, vanadium and tungsten. In some embodiments, the wire or rod is melted in cutting tool formation. As detailed herein, the wire or rod of cobalt-based alloy can be melted to form tips of a sawblade for wood cutting applications.

In a further aspect, methods of cutting wood are described. A method of cutting wood, in some embodiments, comprises forming cutting tips of a sawblade from a cobalt-based alloy comprising chromium in an amount of 25-32 weight percent, tungsten in an amount of 18-21 weight percent, nickel in an amount of 4-6 weight percent, vanadium in an amount of 0.5-1.5 weight percent, carbon in an amount of 0.1-1 weight percent, boron in an amount of 0-2 weight percent and the balance cobalt. The cutting tips are coupled to a saw body and wood is cut with the tips via movement of the saw body.

These and other embodiments are further described in the detailed description, which follows.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Cobalt-Based Alloys

Figure 1:
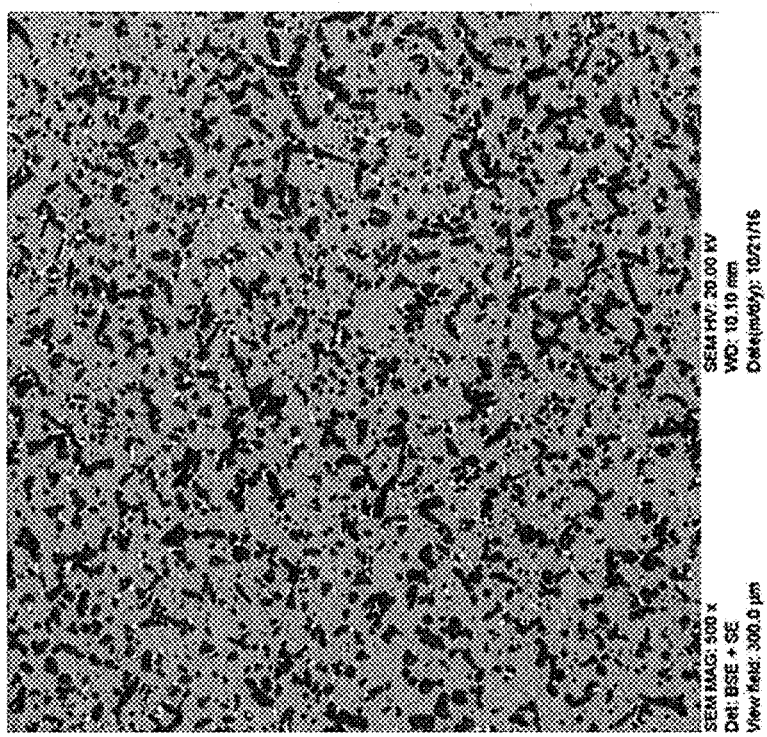
FIG. 1 is a scanning election micrograph (SEM) of a cobalt-based alloy described herein according to some embodiments.

In one aspect, cobalt-based alloys are described herein having composition and microstructure permitting a balance of hardness, toughness, corrosion resistance and wear resistance desirable for wood cutting applications. A cobalt-based alloy comprises a chromium-rich carbide phase in an amount of 15-30 volume percent, a tungsten-rich phase in an amount of 9-15 volume percent and a balance of cobalt-rich solid solution matrix comprising nickel, chromium, vanadium and tungsten. In some embodiments, the chromium-rich carbide phase and tungsten-rich phase are dispersed throughout the cobalt-rich solid solution matrix. FIG. 1 is an SEM of the cobalt-based alloy according to some embodiments. The cobalt-rich matrix phase is gray with chromium-rich carbide phase (black) dispersed therein. The tungsten-rich phase (white) is also dispersed in the cobalt-rich matrix phase.

Turning now to specific components, the chromium-rich carbide phase is present in the cobalt-based alloy in an amount of 15-30 volume percent. In some embodiments, chromium-rich carbide phase is present in an amount selected from Table I.

TABLE I

| Cr-rich Carbide Phase (vol. %) |
| --- |
| 17-28 |
| 19-27 |
| 20-25 |
| 22-24 |

In some embodiments, the chromium-rich carbide phase comprises carbides selected from the group consisting of $M_7C_3$, $M_{23}C_6$, $M_6C$ and mixtures thereof wherein M is chromium or a combination of chromium and at least one of tungsten and cobalt. As illustrated in FIG. 1, the chromium-rich carbide phase can exhibit several morphologies including irregular-shaped, globular, rice-shaped or mixtures thereof.

As described herein, a tungsten-rich phase is present in the cobalt-based alloy in an amount of 9-15 volume percent. The tungsten-rich phase can also be present in an amount of 10-14 volume percent or 10.5-12.5 volume percent. In some embodiments, the tungsten-rich phase is adjacent to and/or contacting the chromium-rich carbide phase in the cobalt-rich solid solution matrix. The tungsten-rich phase can comprise one or more species including, but not limited, to tungsten containing complex carbides ($Co_3W_3C$, $Co_6W_6C$) and/or intermetallic compounds such as $Co_3W$ and/or $Co_7W_6$.

The cobalt-rich solid solution matrix in which the tungsten-rich phase and chromium-rich carbide phase are dispersed can comprise several elemental components forming solid solution with cobalt. The cobalt-rich solid solution, for example, can include nickel, chromium, vanadium and tungsten. In some embodiments, additional transition metals are present including, but not limited to, iron, molybdenum and/or other Group IVB-VIIIB transition metals. The cobalt-rich solid solution matrix forms the balance of the alloy composition. Accordingly, the cobalt-rich matrix phase can generally be present in an amount of 55-76 volume percent. In some embodiments, the cobalt-rich solid solution matrix is present in an amount of 65-70 volume percent. Crystalline structure of the cobalt-rich solid solution can be cubic, hexagonal or mixtures thereof. In some embodiments, crystalline structure of the cobalt-rich solid solution is face-centered cubic (fcc), hexagonal close packed (hcp) or mixtures thereof. If desired, elements stabilizing the cubic crystalline structure of cobalt can be selected for alloying with cobalt in formation of the cobalt-rich solid solution. For example, elements stabilizing the cubic crystalline structure of cobalt can be present in an amount of 13-20 weight percent of total elements forming the solid solution with cobalt. In some embodiments, cubic stabilizing elements are present in an amount of 14-17 weight percent of total elements forming the solid solution with cobalt. Elements stabilizing the cubic crystalline structure of cobalt can be selected from the group consisting of iron, nickel, manganese, vanadium, carbon and various mixtures thereof. Other cubic stabilizing elements may be employed independent of or in addition to those of iron, nickel, manganese, vanadium and carbon.

In some embodiments, strong MC carbide forming elements are excluded from cobalt-based alloys described herein. Several elements display large negative changes in Gibbs free energy when forming MC carbides. Such elements can compete with chromium for carbide formation. As described further herein, carbon content can be limited to 0.1 to 1 weight percent in the cobalt-based alloy composition, in some embodiments. To preclude competition for limited carbon and favor formation of the chromium-rich carbide phase, elements inducing large changes in Gibbs free energy upon metal carbide formation can be generally minimized or excluded from the cobalt-based alloy. In some embodiments, for example, titanium, zirconium, niobium, hafnium and/or tantalum are minimized or excluded from cobalt-based alloys described herein. When minimized, these elements can be individually present in an amount less than 0.5 weight percent.

Figure 2:
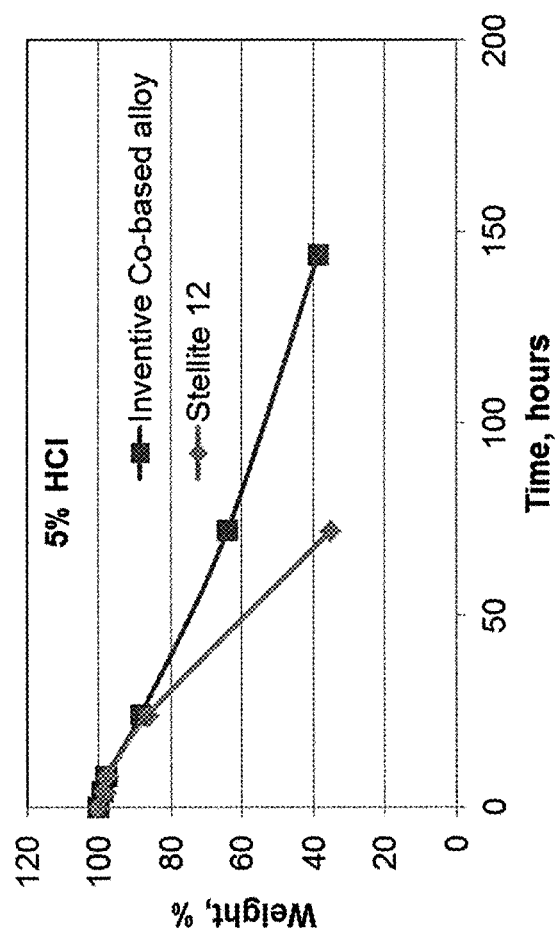
FIG. 2 illustrates gravimetric corrosion resistance of cobalt-based alloy described herein to 5% aqueous HCl solution relative to Stellite™12 cobalt-based alloy, according to some embodiments.
Figure 3:
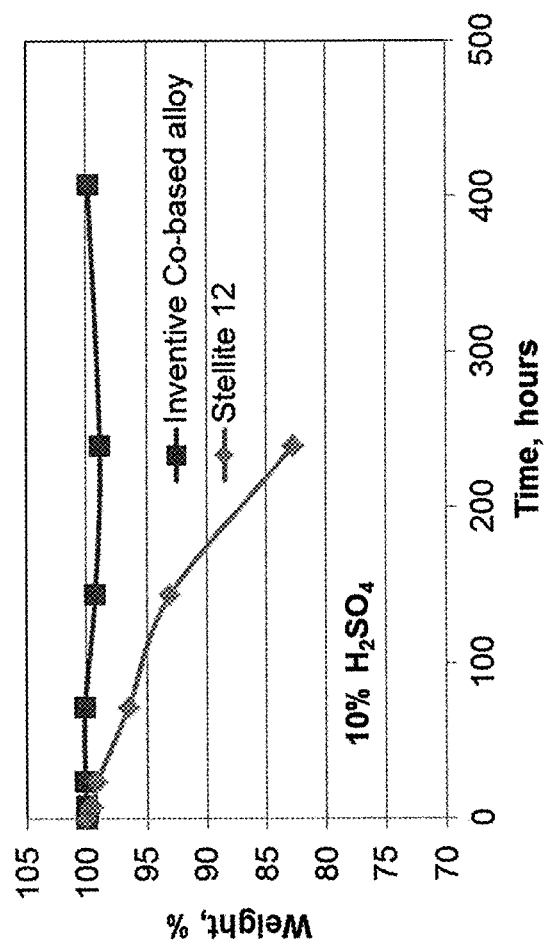
FIG. 3 illustrates corrosion resistance of cobalt-based alloy described herein to a 10% aqueous solution of $H_2SO_4$ in comparison to Stellite™12, according to some embodiments.

In addition to the foregoing microstructural phases, the cobalt-based alloy can comprise a chromium/carbon ratio of 30 to 35. In some embodiments, the Cr/C ratio is 31-34 or 32-33. A Cr/C ratio in these ranges can provide the cobalt-based alloy desirable resistance to various corrosive species including, but not limited to, hydrochloric acid (HCl), sulfuric acid ($H_2SO_4$) and/or nitric acid ($HNO_3$). FIG. 2 illustrates corrosion resistance of cobalt-based alloy described herein to 5% aqueous HCl solution relative to Stellite™12 cobalt-based alloy commercially available from Kennametal, Inc. of Latrobe, Pa. As illustrated in the FIG. 2, cobalt-based alloy having composition and properties described herein exhibited significantly less weight loss in comparison to Stellite™12 and maintained higher corrosion resistance for a substantially longer time period. FIG. 3 illustrates corrosion resistance of cobalt-based alloy described herein to a 10% aqueous solution of $H_2SO_4$ in comparison to Stellite™12. Cobalt-based alloy described herein has superior resistance to $H_2SO_4$, exhibiting essentially no weight loss over 400 hours exposure time. In contrast, the Stellite™12 sample dropped nearly 20 percent in weight over a 250-hour exposure time.

Figure 4:
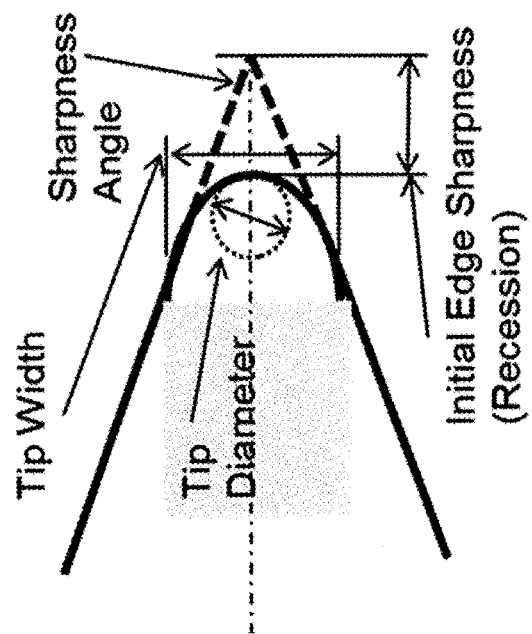
FIG. 4 illustrates various structural features of a tip for wood cutting according to some embodiments.
Figure 5:
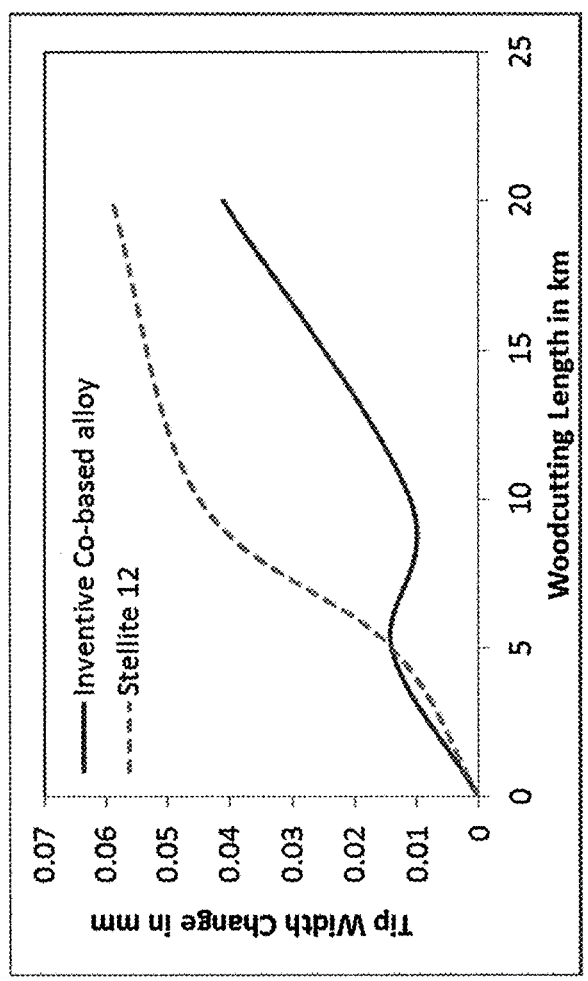
FIG. 5 illustrates change in cutting tip width relative to wood cutting length for inventive and comparative cobalt-based alloys according to some embodiments.
Figure 6:
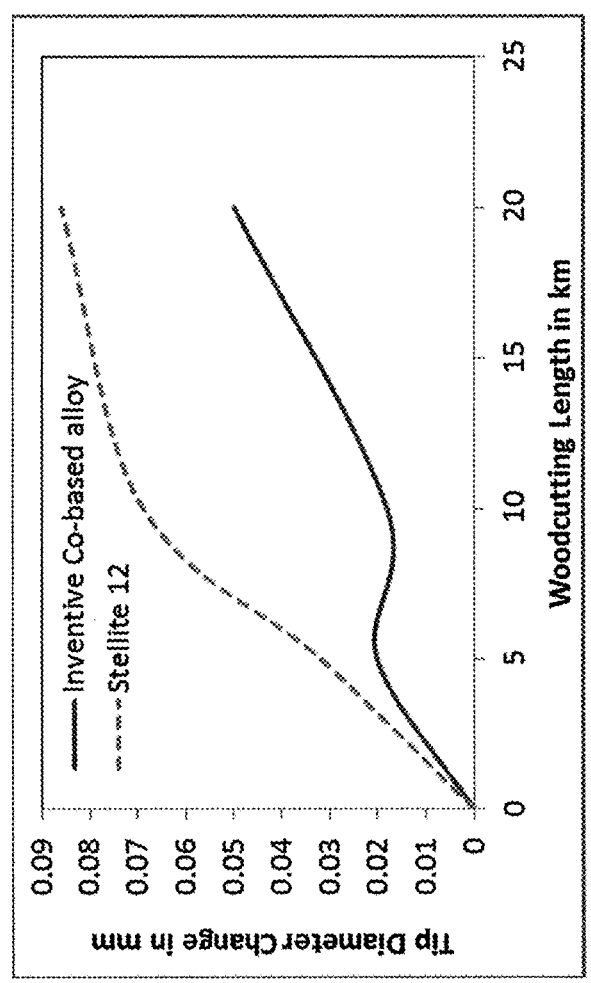
FIG. 6 illustrates change in cutting tip diameter relative to cutting length for inventive and comparative cobalt-based alloys according to some embodiments.

In addition to the Cr/C ratio, the cobalt-based alloy can comprise a tungsten/carbon ratio of 20 to 25. In some embodiments, the W/C ratio is 21-24 or 22-23. A W/C ratio having any of the foregoing values can contribute to wear resistance of the cobalt alloy composition, thereby prolonging the life of cutting elements formed of the alloy composition. FIGS. 4-6 illustrate enhancements to wear resistance provided by cobalt-based alloys described herein. Cutting tips were fabricated from cobalt-based alloy described herein via super-solidus liquid phase sintering and compared to cutting tips fabricated from Stellite™12 via super-solidus liquid phase sintering. Cutting tip width and cutting tip diameter subsequent to wood cutting were measured as an indicator of wear resistance. Change in cutting tip width is defined as the change from starting tip width, which is the distance between tangents of the worn and unworn tooth faces. The cutting tip diameter is the size of the circle that best fits the tooth tip. These structural principles are further illustrated in FIG. 4. FIG. 5 illustrates change in cutting tip width relative to wood cutting length. As illustrated in FIG. 5, cutting tips formed of cobalt-based alloy having composition and properties described herein exhibited significantly greater resistance to wear in comparison to cutting tips formed of Stellite™12. Similarly, cutting tips formed of cobalt-based alloy described herein displayed substantially less erosion in tip diameter, as illustrated in FIG. 6.

The cobalt-based alloy can also comprise boron. For the present alloy system, boron can reduce surface tension to enhance densification of the cobalt-based alloy during cutting element formation. As described further herein, cutting elements can be formed of the cobalt-based alloy by powder metallurgical techniques including super-solidus liquid phase sintering, in some embodiments. When present, boron may incorporate into the chromium-rich carbide phase. For example, boron may form $Cr_7(C,B)_3$ and/or $Cr_{23}(C,B)_6$. Notably, it has been found that the ratio of $(Cr+V)/(C+B)$ plays a role in ductility and toughness of the cobalt-based alloy. While metal carbide formation enhances hardness and wear resistance, ductility and toughness are required to inhibit or preclude cracking and breakage of the cobalt-based alloy, especially in the highly variable operating conditions of cutting untreated wood. In some embodiments, the $(Cr+V)/(C+B)$ ratio has a value greater than 10. In other embodiments, $(Cr+V)/(C+B)$ of the cobalt-based alloy has a value selected from Table II.

TABLE II

| Value of $(Cr + V)/(C + B)$ |
|---|
| ≥15 |
| ≥20 |
| 10-40 |
| 15-30 |
| 20-25 |

As detailed further herein, cobalt-based alloy having composition and properties described in this Section I can be provided as a wire or rod for cutting tool formation. In some embodiments, the wire or rod is melted in cutting tool formation, such as in weld deposition of cutting elements. The wire or rod of cobalt-based alloy, for example, can be melted to form tips of a sawblade for wood cutting applications.

II. Tooling Articles

In another aspect, tooling articles are described. In some embodiments, a tooling article comprises one or more cutting elements formed of a cobalt-based alloy comprising a chromium-rich carbide phase in an amount of 15-30 volume percent, a tungsten-rich phase in an amount of 9-15 volume percent and a balance of cobalt-rich solid solution matrix comprising nickel, chromium, vanadium and tungsten. The cutting elements can be tips of a sawblade for wood cutting applications. Cobalt-based alloy forming the cutting elements, including tips of a sawblade, can have any composition and/or properties described in Section I herein. The cobalt-based alloy, for example, can comprise Cr/C and W/C ratios described in Section I. Moreover, the chromium-rich carbide phase can comprise carbides selected from the group consisting of $M_7C_3$, $M_{23}C_6$, $M_6C$ and mixtures thereof wherein M is chromium or a combination of chromium and at least one of tungsten and cobalt.

Cutting elements, including sawblade tips, can have any design, geometry, angle and/or spacing for wood cutting applications. In some embodiments, cutting tips formed of cobalt-based alloy described herein are joined to a saw body via welding or brazing. For example, the cutting tips can be coated with a brazing material and joined to the saw body by resistance welding or induction welding to ensure sufficient bond strength. In such embodiments, the cutting tips are preformed, usually by powder metallurgical techniques including super-solidus liquid phase sintering of the cobalt-based alloy in powder form. Alternatively, cutting tips can be deposited by weld deposition of the cobalt-based alloy in wire or rod form. Cobalt-based alloy rods or wires can be produced by continuous casting or by powder metallurgical techniques.

III. Methods of Cutting Wood

In a further aspect, methods of cutting wood are described. A method of cutting wood, in some embodiments, comprises forming cutting tips of a sawblade from a cobalt-based alloy comprising chromium in an amount of 25-32 weight percent, tungsten in an amount of 18-21 weight percent, nickel in an amount of 4-6 weight percent, vanadium in an amount of 0.5-1.5 weight percent, carbon in an amount of 0.1-1 weight percent, boron in an amount of 0-2 weight percent and the balance cobalt. The cutting tips are coupled to a saw body and wood is cut with the tips via movement of the saw body.

Compositional aspects of the cobalt-based alloy can be specifically set to provide cutting tips the microstructural phases described in Section I, including the chromium-rich carbide phase, tungsten-rich phase and cobalt-rich solid solution. For example, elements stabilizing cubic crystalline structure of cobalt can be included in the alloy in an amount of 13-20 weight percent of total elements alloyed with cobalt in the solid solution phase. Elements stabilizing the cubic crystalline structure of cobalt can be selected from the group consisting of iron, nickel, manganese, vanadium, carbon and various mixtures thereof. Other cubic stabilizing elements may be employed independent of or in addition to those of iron, nickel, manganese, vanadium and carbon. Moreover, metals inducing large changes in Gibbs free energy upon metal carbide (MC) formation can be generally minimized or excluded from the cobalt-based alloy. In some embodiments, for example, titanium, zirconium, niobium, hafnium and/or tantalum are minimized or excluded from cobalt-based alloys described herein. Minimization or exclusion of these metals can facilitate formation of the chromium-rich carbide phase, in some embodiments. Additionally, boron can be present in the cobalt-based alloy composition. As described herein, the cobalt-based alloy can exhibit a $(Cr+V)/(C+B)$ ratio having a value greater than 10. In other embodiments, $(Cr+V)/(C+B)$ of the cobalt-based alloy has a value selected from Table II above.

Cutting tips for wood cutting applications can be formed from the cobalt-based alloy by several methods. In some embodiments, powder cobalt-based alloy having composition parameters detailed in this Section III is provided and liquid phase sintered to provide the cutting tips. In such embodiments, the cutting tips are preformed and subsequently coupled to the saw body via brazing or welding. Alternatively, the cobalt-based alloy is provided as rod or wire for weld deposition of the cutting tips on the saw body.

Wood cut by the cutting tips can be in any form, including unprocessed or untreated wood. For example, sawblades comprising tips described herein can be employed on-site in harvesting timber from the forest. In other embodiments, wood cut by the cutting tips has undergone one or more processing steps. Wood cutting can also take place at various temperatures. In some embodiments, wood is in a frozen or partially frozen condition when cut by tips formed of the cobalt-based alloy.

These and other embodiments are further illustrated by the following non-limiting examples.

Example 1—Cobalt-Based Alloy Cutting Tips

Figure 7:
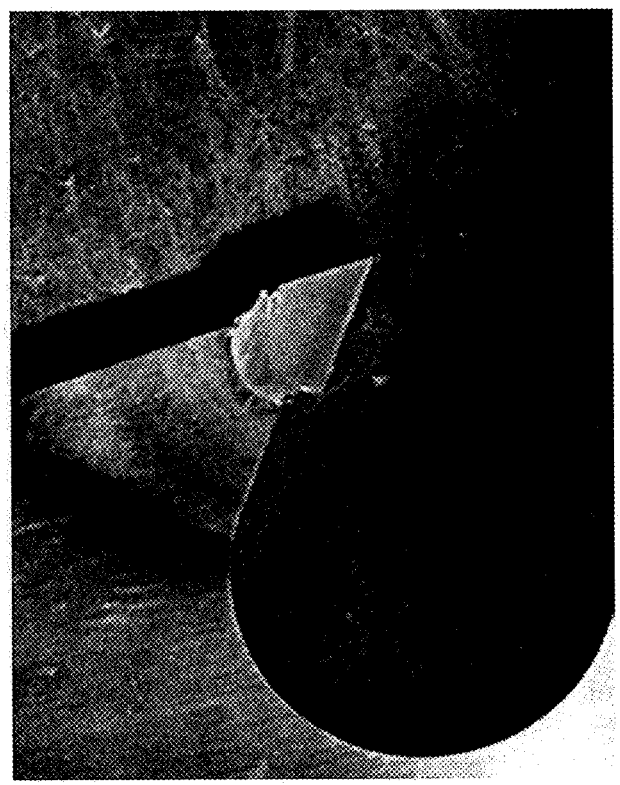
FIG. 7 illustrates a cobalt-based alloy tip according to one embodiment.

C150-240 tips illustrated in FIG. 7 were formed of cobalt-based alloy having composition described in Section I herein. The cutting test employed a 10" VDA saw with 17.125" diameter and 42 teeth. The hook angle was 30° and climb cut SPF wood. No tip breakage and chipping were observed and the cobalt-based alloy tips were 25-30% sharper than Stellite™12 counterparts. Tips ground nicely, and after 8 hours cutting, the saws maintained sharpness and were sharper than Stellite™12 comparative saws. Accordingly, the Stellite™12 saws required sharpening after 8 hours of cutting while the saws employing cobalt-based alloy described herein did not require sharpening for subsequent use.

Example 2—Cobalt-Based Alloy Cutting Tips

WG7140 European-style tips were formed of cobalt-based alloy having composition described in Section I herein. The cutting test employed a larger VDA saw with 19" diameter and 35 teeth. The hook angle was 28° and climb cut Spruce, Pine and Balsam wood. It was noted that the tips foamed of cobalt-based alloy described herein ground easier than Stellite™12 tips and the tips appeared sharper than Stellite™12 tips. After 16 to 24 hours cutting, the cobalt-based alloy tips required minimal sharpening, indicating high resistance to wear.

Example 3—Cobalt-Based Alloy Cutting Tips

250×0.140 triangle cutting tips were formed of cobalt-based alloy having composition described in Section I herein. The cutting test employed a saw with 22" diameter and 24 teeth. The hook angle was 30° and climb cut Cedar wood. The test was conducted in cold winter and with dirty wood. The cutting tips lasted a full day of cutting (8-9 hours) without the need for replacement.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A tooling article comprising:
one or more cutting elements formed of a cobalt-based alloy comprising a chromium-rich carbide phase in an amount of 15-30 volume percent, a tungsten-rich phase in an amount of 9-15 volume percent and a balance of cobalt-rich solid solution comprising nickel, chromium, vanadium and tungsten, wherein the tungsten-rich phase comprises $Co_3W$, $Co_7W_6$ or mixtures thereof.

2. The tooling article of claim 1, wherein the chromium-rich carbide phase and tungsten-rich phase are dispersed throughout the cobalt-rich solid solution matrix.

3. The tooling article of claim 1, wherein the chromium-rich carbide phase is present in an amount of 20-25 volume percent.

4. The tooling article of claim 1, wherein the tungsten-rich phase is present in an amount of 10-13 volume percent.

5. The tooling article of claim 1, wherein the cobalt-rich solid solution matrix further comprises iron.

6. The tooling article of claim 1, wherein the chromium-rich carbide phase comprises carbides selected from the group consisting of $M_7C_3$, $M_{23}C_6$, $M_6C$ and mixtures thereof where M is chromium or a combination comprising chromium and at least one of tungsten and cobalt.

7. The tooling article of claim 1 having a chromium/carbon ratio based on weight percent of 30 to 35.

8. The tooling article of claim 7 having a tungsten/carbon ratio based on weight percent of 20 to 25.

9. The tooling article of claim 1, wherein the one or more cutting elements comprise tips of a sawblade.

10. The tooling article of claim 9, wherein the tips have geometry, angle and spacing for cutting wood.

11. The tooling article of claim 1, wherein the cobalt-rich solid solution comprises one or more elements stabilizing cubic crystalline structure of the cobalt-rich solid solution in an amount of 13-20 weight percent of total elements forming the solid solution with cobalt.

12. The tooling article of claim 1, wherein carbon is present in the cobalt-based alloy in an amount of 0.1 to 1 weight percent.

13. The tooling article of claim 1, wherein the tungsten-rich phase comprises $Co_3W_3C$, $Co_6W_6C$ or mixtures thereof.

14. The tooling article of claim 1, wherein the cobalt-based alloy comprises boron, the boron incorporated into the chromium-rich carbide phase.

15. The tooling article of claim 14, wherein the chromium-rich carbide phase comprises $Cr_7(C,B)_3$, $Cr_{23}(C,B)_6$ or mixtures thereof.

16. The tooling article of claim 1, wherein the cobalt-based alloy comprises boron and a ratio based on weight percent of (Cr+V)/(C+B) is greater than 12.

17. A tooling article comprising:
one or more cutting elements formed of a cobalt-based alloy comprising a chromium-rich carbide phase in an amount of 15-30 volume percent, a tungsten-rich phase in an amount of 9-15 volume percent and a balance of cobalt-rich solid solution comprising nickel, chromium, vanadium and tungsten, wherein the chromium-rich carbide phase comprises $Cr_7(C,B)_3$, $Cr_{23}(C,B)_6$ or mixtures thereof.

18. The tooling article of claim 17, wherein the cobalt-based alloy comprise a ratio based on weight percent of (Cr+V)/(C+B) is greater than 12.

19. The tooling article of claim 17, wherein the chromium-rich carbide phase and tungsten-rich phase are dispersed throughout the cobalt-rich solid solution matrix.

20. The tooling article of claim 17, wherein the chromium-rich carbide phase is present in an amount of 20-25 volume percent.

21. The tooling article of claim 17, wherein the tungsten-rich phase is present in an amount of 10-13 volume percent.

22. The tooling article of claim 17, wherein the cobalt-rich solid solution matrix further comprises iron.

23. The tooling article of claim 17 having a chromium/carbon ratio of 30 to 35.

24. The tooling article of claim 23 having a tungsten/carbon ratio of 20 to 25.

25. The tooling article of claim 17, wherein the one or more cutting elements comprise tips of a sawblade.

26. The tooling article of claim 25, wherein the tips have geometry, angle and spacing for cutting wood.

* * * * *